Patented Aug. 8, 1950

2,517,595

UNITED STATES PATENT OFFICE 2,517,595

COATING OF FOODS WITH PECTINATE FILMS

Harry S. Owens, Berkeley, and Thomas H. Schultz, Lafayette, Calif., assignors to the United States of America as represented by the Secretary of Agriculture No Drawing. Application November 25, 1947, Serial No. 788,078

16 Claims. (Cl. 99—166)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the coating of foods with pectinate films.

An object of this invention is to provide processes for coating foods with pectinate films, particularly calcium-alkali pectinate films.

Another object of this invention is to provide novel food products comprising a food encased in an edible envelope of a pectinate film, particularly a calcium-alkali pectinate film.

A further object of this invention is to provide coating baths suitable for forming pectinate, particularly calcium-alkali pectinate, films.

As used herein, "pectin" is defined as the familiar preparation of commerce or the laboratory, prepared from plant extracts by precipitation with alcohol, acetone, or metallic salts with no attempt to modify its natural methoxyl content. By "pectic acid" is meant a completely demethoxylated pectin, and by "pectinic acid" is meant any one of a series of derivatives of pectin having a methoxyl content intermediate between that of pectin and pectic acid, particularly a methoxyl content from 3 to 8 percent.

The expression "calcium-alkali pectinate" used herein means a salt of such a pectinic acid with calcium and an alkali metal or ammonium. Thus the said expression includes calcium-sodium pectinates, calcium-potassium pectinates, calcium-ammonium pectinates, calcium-sodium-potassium pectinates, and so forth.

In the food-packaging art the encasement of foods in films or casings is well known. Natural casings made from animal intestines are widely used. These casings suffer from the disadvantage that they are tough and often difficult to remove from the food product itself. Artificial casings made from regenerated cellulose are also widely employed. These casings are also tough and inedible.

It has now been found that pectinate films comprising calcium-alkali pectinates are eminently suitable for encasing food products. The films according to this invention are tender and edible and can be eaten right with the food itself. They are odorless and have only a slight salty taste and thus do not detract from the aroma and taste of the food itself. If the food article is to be cooked before eating, as by boiling in water, then the pectinate film will dissolve in the cooking water and thus be entirely removed.

The pectinate film according to this invention provides an edible, smooth, dirt-resisting coating which also serves to hold the food material together and prevents disintegration during storage, shipping, and so forth. It also offers resistance to the action of bacteria and so forth. The pectinate film is also useful to encase normally sticky foods such as dried figs, raisins, candied fruit, etc. The material so encased is no longer sticky and the individual units of foods remain separate even after packaging. Since the film is tender and edible, these food products can be eaten directly and there is no necessity for removing the pectinate film.

The following examples illustrate particular conditions and materials applied according to our invention. These examples are submitted only by way of illustration and not limitation.

Example I

Forty-five parts of a pectinic acid partially neutralized with sodium hydroxide and having a methoxyl content of 3.7% was mixed with 13 parts of glycerin. The mixture was dissolved in 1550 parts of water and the pH adjusted to 5.0 by adding sufficient 0.5 N sodium hydroxide solution with vigorous agitation. The solution was heated to 80° C. and 136 parts of 1.39% calcium chloride solution was added with vigorous stirring. The solution was cooled to 70° C. and maintained at this temperature during the dipping process. The gelation temperature of the dispersion was found to be about 40° C.

A mixture of spices, ground pork meat and pork fat (commonly known as pork sausage) was molded into the shape of small sausages and a wire spike embedded in the end of each for handling purposes. The sausages were dipped into the dispersion described above for 3 seconds and then subjected to a current of air at 50° C. to dry the calcium-sodium pectinate film. The thickness of the film was about 0.001 inch and it was transparent and had a generally pleasing appearance. Since the film is edible, the sausages could be fried directly without any necessity for removing the coating.

Example II

A mixture of 36 parts of pectinic acid (methoxyl content 3.7%) and 11 parts of glycerin was dissolved in 700 parts of water with the addition of 112 parts of 1.0 molar sodium bicarbonate solution. Carbon dioxide was removed from the solution by application of a vacuum. This solution, which had a pH of 5.2, was heated to 80° C. and 90 parts of 1.39% calcium chloride solution was added with vigorous agitation. The solution was cooled to 70° C. and maintained at this temperature during the dipping process. The gelation temperature of the dispersion was about 60° C. Articles formed from ground meat were dipped and dried as set forth in Example I. The film, in this case, was observed to have a thickness of 0.002 to 0.0025 inch.

*Example III*

To a 2.5% solution of sodium pectinate (methoxyl content 3%) in water was added calcium chloride in the proportion of 15 mg. Ca per gram of sodium pectinate. The dispersion was heated to 80° C. One-half pound of candied fruit (a mixture containing cubes of candied cherries, citrus peel, citron peel, melon, etc., and adapted for use in making bakery products such as fruit cakes) was washed with water to remove the sugar syrup clinging to the surface of the particles. The candied fruit was dipped into the calcium-sodium pectinate dispersion at 80° C. then removed, drained, and dipped into a 1% aqueous solution of calcium chloride to harden the gel coating. The coated fruit was removed from the calcium chloride solution and dried in a current of warm air. The candied fruit particles coated with the calcium-sodium pectinate film were not sticky and even after packaging and storing the individual particles remained separate. This action is to be contrasted with the character of the original uncoated candied fruit in which the particles are sticky and cohere together to form a single mass.

As set forth above, the food is coated with the pectinate film by merely dipping it in a dispersion of the calcium-alkali pectinate. It has been found that best results are obtained when the dispersion bath is maintained at about 50° C. to about 80° C., preferably 70° C. The gelation temperature of the dispersion should be from about 40° C. to about 75° C. Varying the gelation temperature of the dispersion permits formation of films of different thicknesses. Thus the closer the gelation temperature is to the temperature of the bath, the thicker the film will be.

Generally, good results are obtained when the food to be coated is at room temperature. However, this factor is not critical and the only requirement is that the food be at a temperature considerably lower than the gelation temperature of the dipping bath. If it is desired to dip foods which are still cold from refrigerated storage, then a dipping bath having a low gelation temperature should be used in order to obtain a film of satisfactory thickness. In the dipping process the dispersion forms a layer of pectinate gel around the food due to the low temperature of said food as compared with the temperature of the bath. When the food coated with the pectinate gel is removed from the bath, the gel coating is further hardened by contact with the air and there is little run-off of coating. Consequently, the coating of pectinate gel is uniform in thickness and when dried forms a uniform, thin film.

The pH of the dispersion is not critical, but generally pH's from 4 to 6 are used. In the case of coating meats, it has been observed that a pH less than 5 causes discoloration thereof. For this reason, with meats a pH of about 5 is generally employed.

Various pectinic acids may be employed in preparing the films according to this invention. Generally, the pectinic acids having a methoxyl content from 3% to 6% prepared by alkaline or acid hydrolysis of pectin give good results. With respect to the pectinic acids prepared by enzymic de-methoxylation of pectin, those with a methoxyl content from 3% to 8% are suitable. In some cases pectic acid may be used to prepare useful films.

The dispersion of the pectinate should contain from 1% to about 8% pectinic acid, depending on how thick a film is desired, and also depending on the molecular weight of the pectinic acid. The more dilute solutions will, of course, produce a thinner film. Thus the thickness of the film is a function of the solids content of the bath.

In preparing the dispersion for the coating operation, it is preferable to start with a partially neutralized pectinic acid, such as sodium hydrogen pectinate, potassium hydrogen pectinate, or ammonium hydrogen pectinate. These partially neutralized pectinic acids are available on the market and are preferred to the pectinic acids themselves, as they are more easily dispersed. If a plasticizer is used, it is mixed with the partially neutralized pectinic acid and then water is added with vigorous agitation. If necessary sodium hydroxide is added to attain the proper pH. Instead of sodium hydroxide, one can employ potassium hydroxide, ammonia, sodium carbonate, potassium carbonate, sodium bicarbonate, potassium bicarbonate, carbonates of ammonia, or other basic materials of this class.

The solution is then heated and a calcium salt is added. Any non-toxic, soluble calcium salt which ionizes to give $Ca^{++}$ ions can be used. Thus one may employ calcium chloride, monocalcium phosphate $[Ca(H_2PO_4)_2]$, calcium acetate, calcium nitrate, and so forth. The only point is to introduce calcium ions. The amount of calcium added is determined by the thickness of film desired and concentration and type of pectinic acid used. The correct amount of calcium to use is most easily ascertained by testing the gelation temperatures of the dispersions. As set forth above, the gelation temperature should be from about 40° C. to about 75° C. In general, the amount of calcium employed should be from about 0.003 to about 0.07 parts by weight of calcium for each part by weight of pectinic acid. The lower amounts of calcium are used with the low-methoxyl pectinic acids, while the higher amounts of calcium are used with the pectinic acids having a higher methoxyl content.

The following table illustrates the approximate amount of calcium required for different pectinic acids prepared by alkaline de-methoxylation of pectin:

| Pectinic acid, per cent methoxyl | Amount of calcium required per part of pectinic acid |
|---|---|
| 5.3 | 0.065 |
| 4.9 | 0.040 |
| 4.5 | 0.020 |
| 3.7 | 0.013 |

When the proper amount of calcium has been added, the dispersion is cooled to proper dipping temperature and is then ready for use. It is usually advisable to add glycerin to improve the flexibility of the film. Generally, the weight of glycerin should be up to about 30% of the weight of the pectinic acid. If a pectinic acid is used as the starting material, the same steps are followed. In this case, however, it is advisable to employ a weakly basic substance to adjust the pH, for instance, sodium bicarbonate. In this way the danger of local de-methoxylation of the pectinic acid is avoided. Other basic materials of the class described above may be used. It is obvious that where a carbonate or a bicarbonate is used for adjusting the pH, vacuum should be applied to the dispersion to remove bubbles of carbon dioxide. The carbon dioxide can also be removed by boiling the solution.

After dipping the food into the calcium-alkali pectinate to form the gel coating it is preferable to harden the coating by dipping the article in an aqueous solution of a soluble calcium salt. Although a solution of calcium chloride is preferred, one may use a solution of any non-toxic, soluble calcium salt. The purpose of this dip is to harden the gel coating so that the individual coated particles will not stick together before the drying has been completed. This mode of operation is generally preferred when handling food particles in bulk where it would be troublesome to keep the individual particles separate while drying.

After the dipping (or after the hardening) operation, the coated food product is dried in the air. Generally, it is preferred to heat the air somewhat above room temperature (about 50° C.) to obtain rapid drying.

Although the coating of foods by dipping has been emphasized, the coating can also be accomplished by spraying the dispersion on the food. To this end the food should be suspended in the air or placed in a rotating drum and sprayed with one of the dispersions described above. Drying of the film is accomplished in the same manner as set forth above.

As heretofore explained, the films according to this invention comprise essentially calcium-alkali pectinates, and usually glycerin as a plasticizer. Other ingredients can be incorporated into the dipping bath whereby the ingredients will also be present in the film. Thus, harmless food colors can be incorporated in the dipping bath to dye the film any desired shade. For instance, a red film may be obtained by incorporating a small amount of F. D. & C. Red #1 in the dispersion bath. Moreover, mold-inhibiting agents may be incorporated to give the film greater protective values. For instance, about 0.1% of ethyl parahydroxybenzoate may be incorporated in the bath. Small amounts of flavoring agents may be added to give the film a distinct odor and/or taste. For instance, a small amount of monosodium glutamate or meat extract may be added to give the film a meat flavor. Antioxidants such as ascorbic acid may be incorporated in the coating bath to give the film anti-oxidant properties. The film can also be used to add vitamins or other nutrients to the food. Thus our process can be used to increase the nutritive value of polished rice or other grains which are low in vitamin content. To this end, the polished rice is dipped in a calcium-alkali pectinate bath containing B vitamins such as thiamin, niacin, pantothenic acid, etc. The bath may also be fortified with an iron salt such as ferric phosphate to increase the food value of the rice.

As set forth above it is preferred to coat the food articles with a calcium-alkali pectinate dispersion to form the desired coating in one step. This result can also be obtained in a two-step process. To this end, the food article is first dipped into an aqueous solution of an alkali pectinate then in a slution of a soluble calcium salt. As the alkali pectinate solution, one may employ a solution of sodium, potassium, or ammonium pectinates or the corresponding acid salts. As the calcium salt in the second stage any non-toxic, soluble calcium salt may be employed. The solutions may be applied by dipping or spraying. A plasticizer or other additives may be dissolved in the first bath to become part of the film. The coating so produced is dried as in the single dip process.

Our process is of wide versatility and can be used to coat many types of food. For instance the process may be used for the coating of food articles such as sausages, bacon, hams, smoked fish, smoked fowl, cheeses, butter, and so forth. The process is also useful to coat foods which are normally sticky to remove this undesirable characteristic. To this end our process can be applied to dried fruits such as dried figs, dates, prunes, raisins, apricots, etc. and to candied fruits such as candied citron peel, citrus peel, melon, pineapple, cherries, pears, and so forth. Our process can be used to coat frozen foods such as frozen meats, poultry, vegetables, fruit, and so forth.

Having thus described our invention, we claim:

1. A food package comprising a food encased in an edible envelope of a calcium-alkali pectinate film, said pectinate being derived from pectinic acid having a methoxyl content from 3 to 8 percent.

2. A food package comprising a food encased in an edible envelope of a calcium-sodium pectinate film, said pectinate being derived from pectinic acid having a methoxyl content from 3 to 8 percent.

3. A food package comprising fruit encased in an edible envelope of a calcium-sodium pectinate film, said pectinate being derived from pectinic acid having a methoxyl content from 3 to 8 percent.

4. A food package comprising candied fruit encased in an edible envelope of a calcium-sodium pectinate film plasticized with glycerin, said pectinate being derived from pectinic acid having a methoxyl content from 3 to 8 percent.

5. The process of coating foods with an edible envelope of a calcium-alkali pectinate film which comprises dipping the food in an aqueous dispersion of a calcium-alkali pectinate and drying the dip coating to form said film, said pectinate being derived from pectinic acid having a methoxyl content from 3 to 8 percent.

6. The process of coating foods with an edible envelope of a calcium-alkali pectinate film which comprises dipping the food in an aqueous dispersion of a calcium-alkali pectinate, dipping the coated food in a solution containing calcium ions to harden the coating, then drying the dip coating to form said film, said pectinate being derived from pectinic acid having a methoxyl content from 3 to 8 percent.

7. The process of coating foods with an edible envelope of a calcium-sodium pectinate film which comprises dipping a food in an aqueous dispersion of a calcium-sodium pectinate and drying the dip coating to form said film, said pectinate being derived from pectinic acid having a methoxyl content from 3 to 8 percent.

8. The process of coating foods with an edible envelope of a calcium-sodium pectinate film which comprises dipping a food in an aqueous dispersion of a calcium-sodium pectinate at a temperature from about 50° C. to about 80° C., and drying the dip coating to form said film, said pectinate being derived from pectinic acid having a methoxyl content from 3 to 8 percent.

9. The process of coating foods with an edible envelope of a calcium-sodium pectinate film which comprises dipping a food in an aqueous dispersion of a calcium-sodium pectinate at a temperature of about 50° C. to 80° C., said dispersion having a gelation temperature of from about 40° C. to about 75° C., and drying the dip coating to form said film, said pectinate being derived from pectinic acid having a methoxyl content from 3 to 8 percent.

10. The process of coating foods with an edible envelope of a calcium-sodium pectinate film which comprises dipping a fruit product in an aqueous dispersion of a calcium-sodium pectinate at a temperature from about 50° C. to about 80° C., said dispersion having a gelation temperature of from about 40° C. to about 75° C., and drying the dip coating to form said film, said pectinate being derived from pectinic acid having a methoxyl content from 3 to 8 percent.

11. The process of coating foods with an edible envelope of a calcium-sodium pectinate film which comprises dipping a fruit product in an aqueous dispersion of a calcium-sodium pectinate at a temperature from about 50° C. to about 80° C., said dispersion having a gelation temperature of from about 40° C. to about 75° C., dipping the coated fruit product in an aqueous solution containing calcium ions to harden the coating, then drying the dip coating to form said film, said pectinate being derived from pectinic acid having a methoxyl content from 3 to 8 percent.

12. A coating bath comprising an aqueous dispersion of a calcium-alkali pectinate having a gelation temperature from about 40° C. to about 75° C., said pectinate being derived from pectinic acid having a methoxyl content from 3 to 8 percent.

13. A coating bath comprising an aqueous dispersion of a calcium-alkali pectinate and glycerin having a gelation temperature from about 40° C. to about 75° C., said pectinate being derived from pectinic acid having a methoxyl content from 3 to 8 percent.

14. A coating bath comprising an aqueous dispersion of a calcium-sodium pectinate and glycerin having a gelation temperature from about 40° C. to about 75° C., said pectinate being derived from pectinic acid having a methoxyl content from 3 to 8 percent.

15. A coating bath comprising an aqueous dispersion of a calcium-sodium pectinate and glycerin, having a pH from about 4 to about 6, and a gelation temperature from about 40° C. to about 75° C., said pectinate being derived from pectinic acid having a methoxyl content from 3 to 8 percent.

16. A coating bath comprising an aqueous dispersion of a calcium-sodium pectinate and glycerin, having a pH of about 5, and a gelation temperature of about 40° C., said pectinate being derived from pectinic acid having a methoxyl content from 3 to 8 percent.

HARRY S. OWENS.
THOMAS H. SCHULTZ.

REFERENCES CITED

The following references are of record in the file of this patent:

UNITED STATES PATENTS

| Number | Name | Date |
|---|---|---|
| 1,510,679 | Katzprowsky | Oct. 7, 1924 |
| 1,634,879 | Nanji et al. | July 5, 1927 |
| 2,245,576 | Dickinson et al. | June 17, 1941 |
| 2,418,865 | Bryant | Apr. 15, 1947 |

OTHER REFERENCES

Baker, "Food Industries," January, 1941, Page 56.